United States Patent Office 3,249,330
Patented May 3, 1966

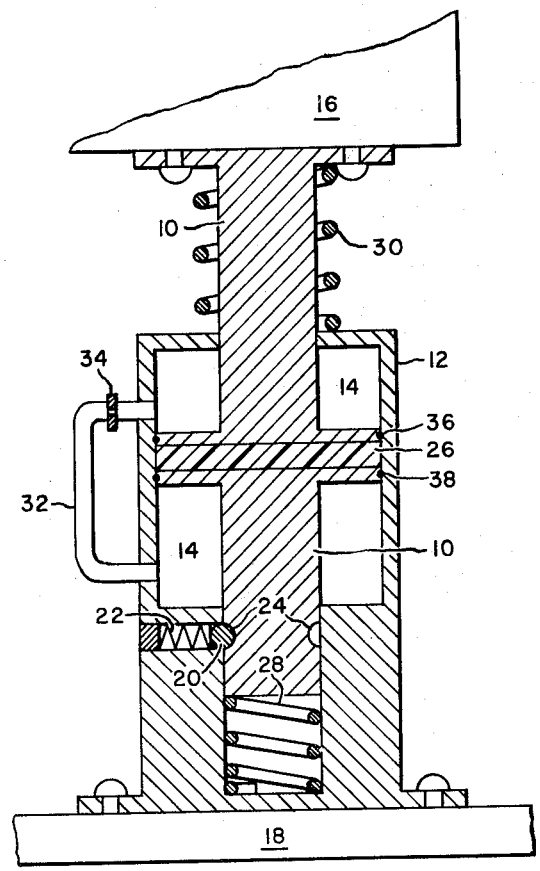
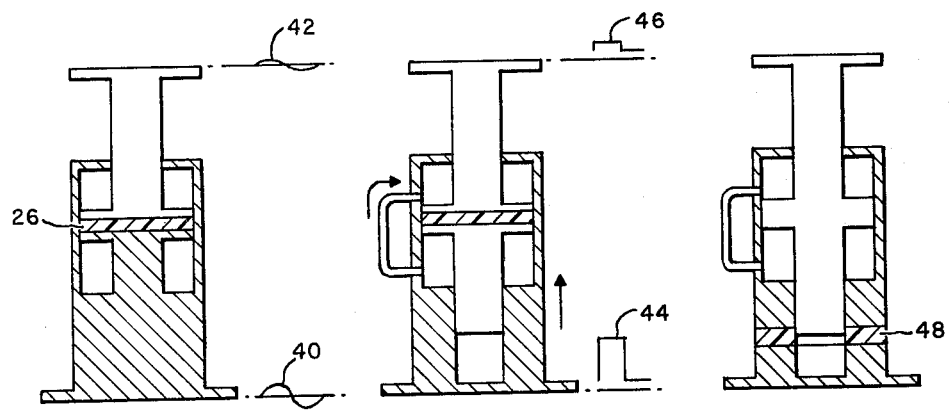
FIG. 1
FIG. 2    FIG. 3    FIG. 4

3,249,330
SHOCK AND VIBRATION ISOLATION MOUNTING
Carl O. Preis, Baldwin, N.Y., assignor to Hazeltine Research, Inc., a corporation of Illinois
Filed Nov. 29, 1963, Ser. No. 326,862
4 Claims. (Cl. 248—358)

This invention is directed toward mountings for providing isolation from both shock and vibration.

When apparatus, such as an electronic chassis, is mounted in a vehicle, such as a ship, operation of the apparatus may be hampered or prevented by vibration transmitted to such apparatus from the vehicle. Also if the vehicle is subjected to a shock of great force, this shock transmitted to apparatus mounted in the vehicle may be sufficient to damage or destroy such apparatus. Many arrangements have been suggested for providing isolation from vibration. Similarly, arrangements have been suggested for providing isolation from shock. However there exists a need for mounts which provide efficient isolation from both vibration and shock.

The objects of this invention are to provide new and improved mountings for providing isolation from shock and vibration, and especially mountings which provide isolation from vibration and repeated shocks.

In accordance with the invention a mounting for providing isolation from shock and vibration comprises a shock absorber comprising a cylinder and a piston and a fluid in the cylinder, retaining means for holding the piston in an essentially fixed position relative to the cylinder in the absence of a shock exceeding a predetermined minimum force and means for providing attenuation of vibration of one portion of the piston relative to another portion of the piston; the mounting being so constructed and arranged that in the presence of a shock exceeding the predetermined force, the mounting acts as a shock absorber and at all other times the mounting acts as a simple vibration absorber.

For a better understanding of the present invention together with other and further objects thereof, reference is had to the following description taken in connection with the accompanying drawing, and its scope will be pointed out in the appended claims.

In the drawing:

FIG. 1 is a cross-sectional view of a complete mounting for providing isolation of shock and vibration constructed in accordance with the invention;

FIGS. 2 and 3 are simplified drawings useful in describing operation of the FIG. 1 mounting, and FIG. 4 is a simplified drawing showing an alternate type of construction in accordance with the invention.

Referring now to FIG. 1 there is shown a mounting for providing isolation from shock and vibration constructed in accordance with the invention. The major components of the illustrated mounting are of circular horizontal cross-section. This mounting includes first means for providing attenuation of shock, shown as comprising a piston 10 riding in a cylinder 12 which contains a fluid (not shown) in annular space 14. As shown, the piston 10 includes an upper portion and a lower portion and is constructed so as to permit connection of its upper end to a load, such as 16, which is to be protected from shock and vibration. Cylinder 12 is shown as being constructed so that its lower end can be connected to a support, such as 18, which might be the deck of a ship. In both cases, connection can be made by use of bolts or other appropriate means.

The mounting of FIG. 1 further includes second means for restraining operation of the first means in the absence of a shock exceeding a predetermined minimum force. The second means are shown as restraining means for holding the piston 10 in an essentially fixed position relative to the cylinder 12. More specifically, in FIG. 1 these means are shown as metal ball 20 which is pushed by spring 22 into an indentation 24 in the piston 10. In the illustrated mounting, indentation 24 is an annular groove and an odd number of symmetrically-spaced spring-loaded balls are involved so that only one ball 20 can be seen in the sectional view of FIG. 1.

The mounting of FIG. 1 also includes third means for providing attenuation of vibration of one portion of the first means relative to another portion of the first means. As shown, the third means comprises vibration absorber means 26 in the form of a pancake-shaped vibration damping pad situated between the upper and lower portions of piston 10. Vibration damping devices are well known and means 26 may take any one of many appropriate forms such as a pad of rubber having vibration absorbing properties, or an arrangement including a spring or springs with provision for adequate damping to absorb vibration, for example.

The mounting as illustrated also includes means for returning the piston 10 to the original fixed position (i.e., with ball 20 riding in indentation 24) after displacement by a shock, so that the mounting is reset for later shocks. As shown, these means comprise two springs 28 and 30 arranged to push piston 10 back up into the original fixed position following a downward displacement of the piston 10 as the result of a shock.

The configuration shown in FIG. 1 also includes one or more bypass tubes such as tube 32, including a valve or orifice 34, for permitting controlled flow of the above-mentioned fluid from the upper portion to the lower portion of annular space 14 during shock conditions and a reverse flow during resetting of the piston following a shock. The design of such bypass arrangements will be apparent to those familiar with piston-type shock absorbers and it may in some instances be desirable to provide a variable orifice whose size is related to the relative positions of the cylinder and piston so as to control the transfer of fluid more completely. The mounting of FIG. 1 is shown as also including O-rings or gaskets 36 and 38 for providing a seal between cylinder 12 and the two portions of piston 10.

Operation of the FIG. 1 mounting will be discussed with reference to the simplified operational drawings of FIGS. 2 and 3. FIG. 2 shows the effective make-up of the FIG. 1 mounting in the absence of a shock. Piston 10 is held in an essentially fixed position relative to cylinder 12 so that the mounting effectively consists of only three major components; a base, the vibration absorber 26 and a vibration isolated upper portion. In operation, if the base is subjected to vibration as represented by curve 40, the absorber 26 will act to reduce the vibration to which the load is subjected, as indicated by curve 42.

FIG. 3 shows the effective make-up of the FIG. 1 mounting when subjected to a shock of sufficient force to overcome the retaining effect of ball 20 riding in indentation 24. The retaining means acts as a resettable mechanical fuse to prevent movement of the piston 10 relative to cylinder 12 in the absence of a shock exceeding a predetermined minimum force. As indicated in FIG. 3, when subjected to a shock exceeding the predetermined minimum force, the mounting becomes an efficient shock absorber utilizing the well known arrangement of a piston riding in a cylinder under the influence of a constrained fluid which passes through tube 32 to the other side of the piston thereby dissipating energy. In operation, if the base is subjected to a shock as represented by curve 44, the mounting will act as a shock absorber to reduce the shock to which the load is subjected, as indicated by curve 46. After the passing of such a shock, the springs 28 and 30 act to force the piston 10 back up to its original position at which point it will again become restrained by ball 20 riding in indentation 24. In use, a load (an electronic apparatus for example) would normally be supported by four mountings such as the one shown in FIG. 1, one at each corner; however, different numbers of mountings can be utilized where appropriate.

It will now be appreciated that mountings constructed in accordance with the present invention provide vibration isolation characteristics which are not limited or degraded by the requirement of also providing shock isolation. Conversely, the mountings disclosed provide shock isolation characteristics which are not limited or degraded by the requirement of also providing vibration isolation. As explained above, this is because the shock absorbing capability comes into play only in the presence of shocks exceeding a predetermined minimum force, so that at all other times the mounting acts as a highly efficient vibration absorber whose performance is not affected by the shock absorbing capability.

Once the principles of the invention are understood, many variations of mountings constructed in accordance with the invention will be obvious to those skilled in the art. For example, the retaining means may be of a different form as long as the basic function of providing a predetermined retention is provided. Also as shown in the simplified drawing of FIG. 4, instead of means 26 situated between the two portions of piston 10 as shown in FIG. 1, a one-piece piston can be utilized and the vibration absorbing means can take the form of pad 48 in FIG. 4 which is situated between two portions of the base of the cylinder 12.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A mounting for providing isolation from shock and vibration comprising:
    a shock absorber comprising a cylinder and a piston and a fluid in said cylinder;
    retaining means for holding said piston in an essentially fixed position relative to said cylinder in the absence of a shock exceeding a predetermined minimum force;
    and means for providing attenuation of vibration of one portion of said piston relative to another portion of said piston;
    the mounting being so constructed and arranged that in the presence of a shock exceeding said predetermined force, the mounting acts as a shock absorber and at all other times the mounting acts as a simple vibration absorber.

2. A mounting of the type described in claim 1, wherein there is included means for returning said piston to said fixed position after displacement by a shock, so that the mounting is reset for later shocks.

3. A mounting for providing isolation from shock and vibration comprising:
    a cylinder containing a fluid and arranged for connection to a support;
    a piston riding in said cylinder and arranged for connection to a load to be isolated;
    retaining means for holding said piston in an essentially fixed position relative to said cylinder in the absence of a shock exceeding a predetermined minimum force;
    and means for attenuating vibration of one portion of said piston relative to the remainder of said piston;
    the mounting being so constructed and arranged that in the presence of a shock exceeding said predetermined force, the mounting acts as a shock absorber and at all other times the mounting acts as a simple vibration absorber.

4. A mounting of the type described in claim 3, wherein there is included spring means for returning said piston to said fixed position after displacement by a shock, so that the mounting is reset for later shocks.

References Cited by the Examiner

UNITED STATES PATENTS

| 2,272,344 | 2/1942 | Kimbro | 267—1 |
| 2,387,066 | 10/1945 | Harding | 248—358 |
| 2,982,510 | 5/1961 | Curriston et al. | 248—358.1 |

CLAUDE A. LE ROY, *Primary Examiner.*

FRANK L. ABBOTT, *Examiner.*

J. PETO, *Assistant Examiner.*